United States Patent [19]

Leary

[11] Patent Number: 4,558,210

[45] Date of Patent: Dec. 10, 1985

[54] ELECTRIC CAST-METAL HEATER

[75] Inventor: John F. Leary, Batavia, Ill.

[73] Assignee: Watlow Electric Manufacturing Company, St. Louis, Mo.

[21] Appl. No.: 637,283

[22] Filed: Aug. 3, 1984

[51] Int. Cl.⁴ .............................................. H05B 3/58
[52] U.S. Cl. .................................. 219/535; 219/301; 219/530; 219/540; 338/294
[58] Field of Search ............... 219/301, 460, 523, 530, 219/535, 540, 544; 338/240, 284, 294

[56] References Cited

U.S. PATENT DOCUMENTS

| | | | |
|---|---|---|---|
| 1,614,168 | 1/1927 | Abbott | 219/540 |
| 1,617,916 | 2/1927 | Karcher et al. | 219/540 X |
| 2,085,772 | 7/1937 | Soverhill | 219/540 X |
| 2,203,620 | 6/1940 | Smith | 219/540 X |
| 2,469,800 | 5/1949 | Vogel | 338/240 X |
| 2,820,133 | 1/1958 | Norton | 219/535 X |
| 3,244,861 | 4/1966 | Colburn | 219/438 |
| 3,355,766 | 12/1967 | Cansemann | 219/301 X |
| 3,676,642 | 7/1972 | Rosen et al. | 219/301 X |
| 3,849,630 | 11/1974 | Halliday | 219/535 |
| 4,254,326 | 3/1981 | Wallier et al. | 219/535 |

Primary Examiner—Volodymyr Y. Mayewsky
Attorney, Agent, or Firm—Senniger, Powers, Leavitt and Roedel

[57] ABSTRACT

An electric heater comprising a metal casting having an electric heating element of sinuate shape cast therein. The casting has a plurality of ventilation openings therethrough located between the sinuations of the heating element for permitting air to flow directly to the surface on which the heater is mounted for ventilating and cooling it.

4 Claims, 4 Drawing Figures

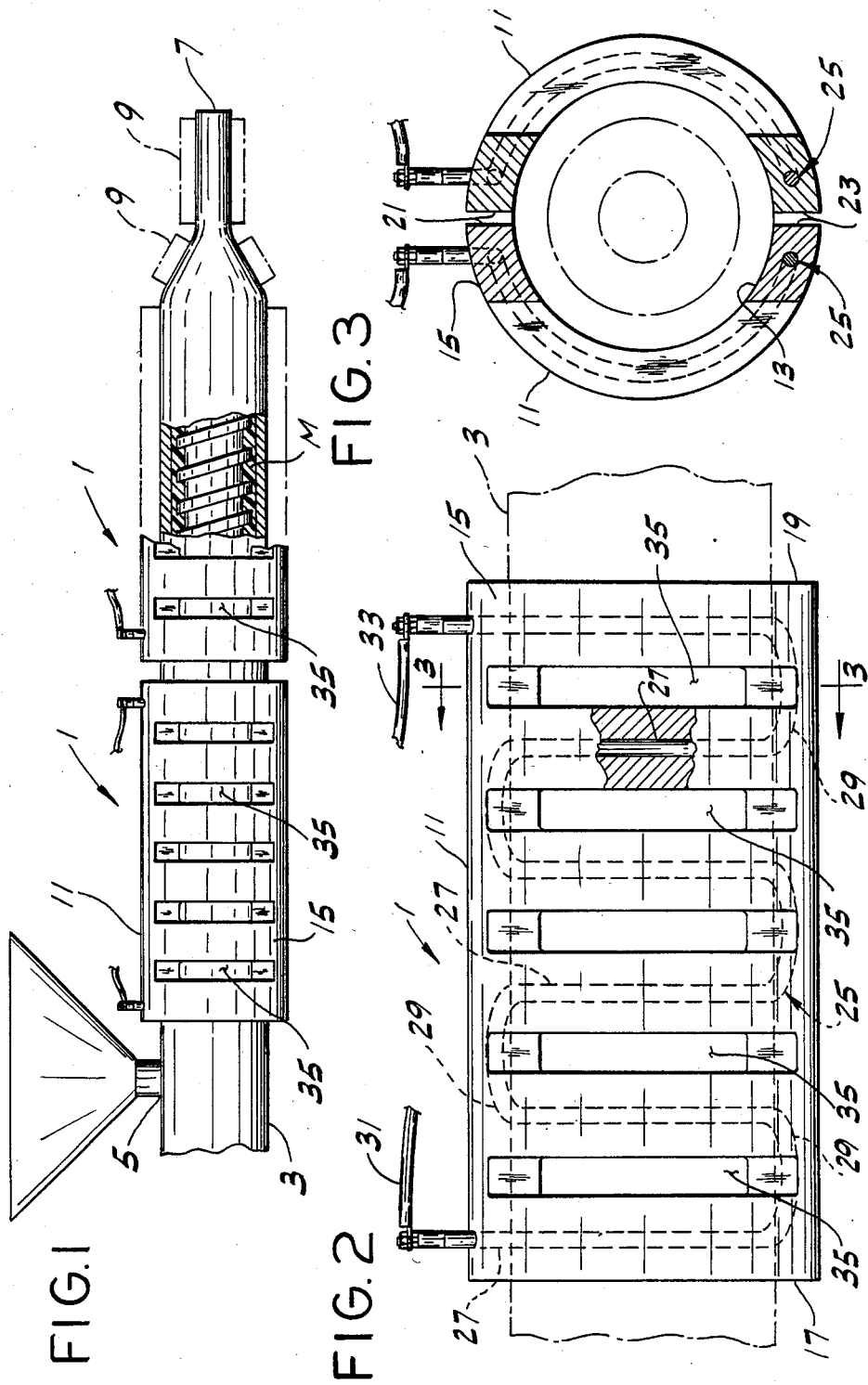

ELECTRIC CAST-METAL HEATER

BACKGROUND OF THE INVENTION

This invention relates generally to heaters and more particularly to an electric cast-metal heater especially adapted for heating plastic extrusion equipment.

Electric heaters are typically used to heat the barrel of an extruder to initiate the extrusion process. Thereafter the heater becomes less necessary, at least in instances where the friction generated by the movement of material through the barrel provides sufficient heat to maintain the material in a fluid state. In those instances, the heat generated by such movement may become so great that it must be dissipated to avoid adverse effects on the extruded product. In large systems generating a correspondingly large amount of heat, cast-aluminum heaters with integral (cast-in) electrical heating elements and cooling tubes are frequently used. An alternate approach is the use of a finned cast-aluminum heater and high-capacity blower system for cooling the heater. On smaller machines the use of a plurality of relative narrow electric heater bands is common. Such bands are usually secured (e.g., clamped) to the barrel at spaced intervals and air then blown over the heaters and exposed portions of the barrel to provide the necessary cooling.

All of the heating/cooling systems described above have serious drawbacks. Thus, the cast-aluminum heaters with integral cooling tubes or fins are expensive, and the separate band heaters require individual mounting and numerous electrical connections (two per heater) making handling and installation inconvenient. Moreover, use of separate band heaters has resulted in barrel warpage. Accordingly, there is a need in the industry for an improved heater which avoids these drawbacks.

SUMMARY OF THE INVENTION

Among the several objects of this invention may be noted the provision of an improved electric heater which may be used on both large and small extruders; the provision of such a heater which is capable of allowing the necessary barrel cooling; the provision of such a heater which has a relatively low mass and correspondingly fast thermal response; the provision of such a heater which has a minimum of mounting and electrical connections for convenient handling and installation; the provision of such a heater which is adapted for uniform heating and cooling to avoid warping of the barrel; the provision of such a heater which operates at lower internal heater temperatures due to more efficient heat transfer to the barrel; and the provision of such a heater which is simple in design and requires less material for manufacture.

Generally, an electric heater of this invention comprises a metal casting having an inside face adapted for engagement with a surface to be heated, an outside face, opposite ends, and an electric heating element of sinuate shape cast therein. The heating element has a plurality of generally parallel sections lying in generally parallel planes extending crosswise with respect to the casting at intervals spaced lengthwise thereof, and a plurality of bridging sections extending generally lengthwise of the casting connecting said parallel sections to form a series of sinuations. The heating element has ends protruding from the casting to form terminations adapted for connection to an electrical power source. The casting has a plurality of ventilation openings therethrough located between at least some of the parallel sections of the heating element for permitting air to flow directly to said surface for ventilating and cooling it.

Other objects and features will be in part apparent and in part pointed out hereinafter.

BRIEF DESCRIPTION OF THE DRAWINGS

FIG. 1 is an elevational view of a plurality of heaters of this invention in place on the barrel of an extruder, portions of one heater and the barrel being broken away to illustrate details;

FIG. 2 is an enlarged portion of FIG. 1 showing one of the heaters, part of the heater being broken away to show a portion of an electric heating element;

FIG. 3 is a vertical section taken on line 3—3 of FIG. 2; and

Corresponding reference characters indicate corresponding parts throughout the several views of the drawings.

DESCRIPTION OF THE PREFERRED EMBODIMENT

Figure 4:
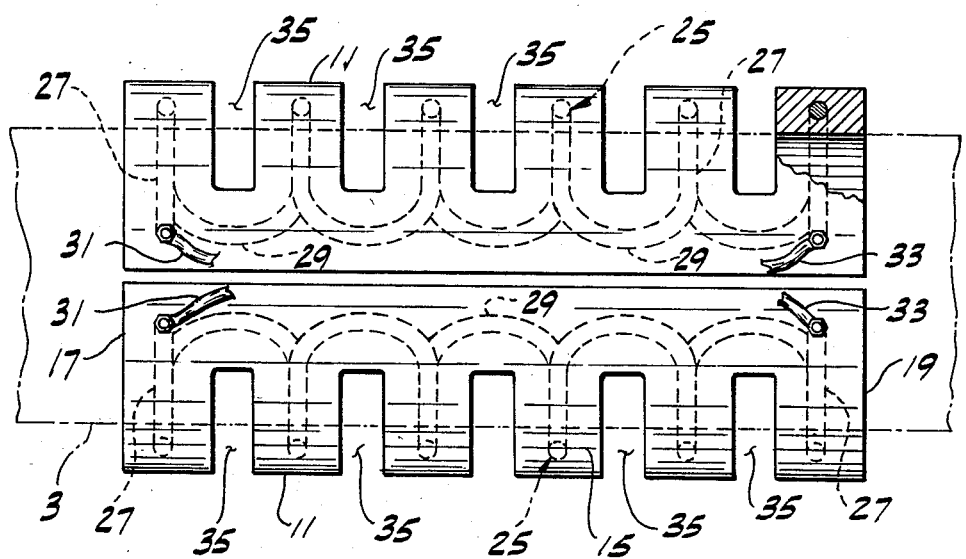
FIG. 4 is a top view of FIG. 2.

Referring now to the drawings, and more particularly to FIG. 1, a plurality of electric heaters of this invention, each generally indicated at 1, are shown mounted on the barrel 3 of an extruder 5, as by conventional band clamps or straps (not shown). As illustrated, the extruder is a screw extruder wherein the plastic material M to be extruded is moved through the barrel by a screw in conventional fashion and then forced through a die 7 at the downstream (right as viewed in FIG. 1) end of the barrel. Conventional heaters 9 (shown in phantom) not constituting a part of the present invention may be used to heat the die.

Each electric heater 1 comprises a semi-cylindric cast-metal (e.g., cast aluminum) body 11, sized and shaped to fit the barrel in the manner shown, the arrangement being such that two castings 11 mounted on opposite sides of the barrel encircle approximately the entire circumference of the barrel for providing uniform heating of the barrel. Additional pairs of castings 11 are provided as necessary according to the length of the barrel, two such pairs being illustrated in FIG. 1.

Each casting 11 has an inside face 13 adapted for engagement with the barrel, an outside face 15, opposite ends 17, 19 and upper and lower (side) edges 21,23 extending lengthwise of the casting between the ends thereof. Edges 21 and 23 lie in the same vertical plane (see FIG. 3). Embedded (cast) in each casting 11 is a conventional electric heating element, generally designated 25, such as a tubular heater of the type sold under the trademark WATROD by Watlow Electric Manufacturing Company of St. Louis, Mo. This element is sinuate in shape, having a plurality of generally parallel sections, each designated 27, lying in generally parallel planes (vertical planes are viewed in FIGS. 1 and 2) extending crosswise with respect to the casting at intervals spaced lengthwise thereof. These sections 27 are bent to have the same curvature as the casting 11 and extend to points adjacent the upper and lower edges 21, 23 of the casting. Sections 27 are connected by a plurality of bridging sections, each designated 29, extending generally lengthwise of the casting to form a series of sinuations, as best illustrated in FIG. 2. The ends of the heating element 25 protrude vertically upwardly from the casting 11 generally adjacent opposite ends thereof for connection via standard electrical terminations to respective leads 31, 33 of an electric power source.

In accordance with this invention, each semi-cylindric casting 11 has a plurality of ventilation openings 35 therethrough for permitting air to flow directly to the barrel surface for ventilating and cooling it. These openings are preferably in the form of slots extending circumferentially with respect to the casting midway between adjacent parallel sections 27 of the heating element 25. The slots 35 are relatively long (only slightly shorter than the length of the parallel sections 27 of the heating element 25) but narrow, the configuration being such as to maximize the amount of exposed barrel surface for greatest cooling efficiency while still providing sufficient casting surface to ensure uniform heating along the length of the barrel. For example, for a 13-inch long casting sized to fit an extruder barrel having an outside diameter of four inches, five 0.750-inch wide slots may be provided spaced at equal intervals lengthwise of the casting. The top and bottom edges of the slots in each casting lie in a common vertical plane extending lengthwise of the casting, as illustrated in FIG. 3.

In the embodiment shown, a slot 35 is provided between the two parallel sections 27 of each sinuation of the heating element. However, it will be understood that this is not essential to the operation of the heater, and that the number of slots could vary.

When the castings 11 are mounted on the extruder in the manner shown in the drawings, air is adapted to be blown upwardly through slots 35 directly onto the exposed surface of the barrel for cooling it. No integral cooling tubes are required and cooling is more effective than on finned units. The fact that the castings are slotted also reduces the bulk of the heater for more economical manufacture. Moreover, use of the slotted castings of the present invention eliminates the need in smaller systems for numerous separate narrow band heaters, thus reducing the number of mounting and electrical connections which must be made. Furthermore, total embedment of the heating element 25 in the aluminum casting 11 improves heat transfer to the barrel, thereby reducing the temperature at which the heating element must operate, as compared to the less effective narrow-band heaters wherein the heating elements have only limited contact with the heater body (typically extruded channel). Reduced element temperature results in longer heater life.

While each casting 11 depicted in the drawing is semi-cylindric for fitting the barrel of an extruder, it is contemplated that the casting may take different forms for different applications. For example, it is contemplated that the casting may be flat and generally planar for use as a platen heater, for example. Other shapes for other applications may also be appropriate.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electric heater comprising a generally semi-cylindric metal casting having an inside face adapted for engagement with a surface to be heated, such as the barrel of an extruder, an outside face, opposite ends, and an electric heating element of sinuate shape cast in said casting between said inside and outside faces thereof, said heating element having a plurality of generally parallel sections lying in generally parallel planes extending crosswise with respect to the casting at intervals spaced lengthwise thereof, and a plurality of bridging sections extending generally lengthwise of the casting connecting said parallel sections to form a series of sinuations, said heating element having ends protruding from the casting to form terminations adapted for connection to an electrical power source, said casting having a plurality of ventilation openings therein located between at least some of the parallel sections of said heating element and extending generally circumferentially with respect to the casting for permitting outside air to flow inwardly through said openings directly to said surface for ventilating and cooling it.

2. An electric heater as set forth in claim 1 wherein said openings comprise a plurality of slots.

3. An electric heater as set forth in claim 2 wherein a slot is provided between the two parallel sections of each sinuation.

4. An electric heater as set forth in claim 3 wherein the casting is of aluminum.

* * * * *